United States Patent Office 3,500,928
Patented Mar. 17, 1970

3,500,928
SAND CONSOLIDATION IN OIL WELLS WITH AMORPHOUS GUANIDINE SILICATE
Norman P. Rockwell, Greenville, Del., assignor to E. I. du Pont de Nemours and Company, Wilmington, Del., a corporation of Delaware
No Drawing. Filed Aug. 13, 1968, Ser. No. 752,162
Int. Cl. E21b *33/138, 33/13*
U.S. Cl 166—292          7 Claims

ABSTRACT OF THE DISCLOSURE

A consolidation of sands in fluid producing wells has been accomplished by a novel process whereby amorphous ionic guanidine silicate or ammonium silicate having an average molecular weight of less than 25,000 is injected through the well into the surrounding sands and the guanidine silicate or ammonium silicate is set by ambient heat or by chemical reaction to bond the sand particles.

BACKGROUND OF THE INVENTION

In many fluid producing wells sanding conditions exist in the gas or oil producing intervals of the well. Such sanding conditions are noticeably present in oil wells occurring near coastal regions. In some cases the sanding conditions will necessitate the complete ceastation of oil outflow. Sand damages to the equipment in combination with replacement of equipment results in expensive production losses.

Numerous suggestions both mechanical and chemical have been proposed to overcome this problem. It is disclosed in U.S. Patent 3,175,611 that the problem may be partially solved by the adoption of a process which utilizes sodium silicate to consolidate the sands. This process involves several steps which are sequentially critical and are time consuming in themselves.

Utilization of a chemical reaction approach to the consolidation of the sands is somewhat hampered by the actual conditions existing in the well itself. Temperature in the well will often be up to 300° F. and the presssure at well depth may be between 1000 to 15,000 lbs./sq. in. Additionally, the existence of brine solutions and other salt solutions such as those of calcium, magnesium and zinc salts are generally detrimental to chemical reactions used to consolidate the sands.

SUMMARY OF THE INVENTION

Many of the problems associated with the consolidation of sands in fluid producing wells have been overcome by the process of injecting solutions of amorphous ionic guanidine silicate or ammonium silicate having an average molecular weight of less than 25,000 through the well into the surrounding sand and setting the mixture to bind the sand particles together. Additionally, gas forming agents can be used to increase the porosity as desired.

DESCRIPTION OF THE INVENTION

The guanidine silicate utilized in this invention is amorphous and ionic. It can be prepared by mixing guanidine hydroxide with a source of active silica under controlled conditions. Alternatively a guanidine form of a cationic exchange resin can be prepared by contacting the hydrogen form of the resin with guanidine hydroxide or guanidine carbonate. The resulting guanidine cationic exchange resin can be reacted with an alkaline metal silicate solution to yield the amorphous guanidine silicate. It is necessary in each operation for preparing the amorphous ionic guanidine silicate that the mole ratio of guanidinium ions to silicate ions in the reaction solution fall within the limits of 1.5 to 0.65. Preparation of the amorphous ionic guanidine silicates is disclosed in U.S. patent application Ser. No. 715,556, filed Mar. 25, 1968. This application shows many methods of setting the guanidine silicates.

The ammonium silicates which are useful in this invention have an average molecular weight of less than 25,000 and can be prepared by methods such as that disclosed in U.S. Patent 3,346,334.

The silicates of this invention are injected under pressure into the sand stratum which is being treated. The silicates are in the form of an aqueous mixture and will begin to set at thermal conditions generally found in the well at the sand stratum level. The setting will be accelerated by increasing temperatures. The guanidine silicates will begin to decompose at temperatures above 75° C. and the sand particles will begin to set with the free silica while the decomposition product will yield a gas which will aid in maintaining a porous structure. The ammonium silicates are not easily set by heat and an accelerator is needed to initiate bonding.

The silicate solutions of this invention are basic and setting may be accelerated with an acid medium including carbon dioxide. Setting of the silicates in the sand stratum of an oil well by using carbon dioxide exhibits the extra feature of having a preformed gas being introduced into the sand stratum which will set the guanidine silicate and aid in increasing porosity but the introduction of gaseous carbon dioxide into the stratum will be greatly affected by the pressure on the stratum. Extremely high pressures on the stratum will make it impractical to inject the gaseous carbon dioxide. Latent acids may be introduced with the silicate solutions to facilitate the setting of the silicates in contact with the sand. These latent acids are generally represented by organic esters, e.g. ethylacetate, and amides, e.g. formamide, which will hydrolyze to yield an acid capable of being titrated. The temperature and aqueous conditions in the oil well will increase the hydrolysis of these latent acids and thereby increase the rate of setting of the guanidine silicate in contact with the sand.

The chemical reactivity of the guanidine cation in amorphous guanidine silicate can also be used to bring about setting reactions. The hydrogens on the amine groups which are constituents of the guanidine cation, are exceedingly active and react with formaldehyde, urea formaldehyde, phenol formaldehyde, melamine formaldehyde, and, in general, with all materials which contain active aldehyde or methollyl groups derived from the condensation of aldehydes with active hydrogens. Guanidine silicate solutions are compatible with the B stage resins of the above type or with formaldehyde itself and do not immediately react at room temperature. However, at 50° C., condensation reactions typical of this class of materials occur and water-insoluble copolymers between guanidine silicate and such aldehyde derived polymers are formed which are bonded to the contacted sand of the stratum.

An interesting aspect of this reaction is that as the guanidine silicate condenses with formaldehyde or a formaldehyde derivative of the above-mentioned type, the symmetry of its configuration is destroyed and the resonance stabilization which makes guanidine such a strongly basic cation is impaired. Thus, as guanidine condenses with formaldehyde or formaldehyde-type derivatives, its basicity drops, and this in turn brings about the simultaneous polymerization of the silicate anion as the guanidine cation is incorporated as part of an aldehyde-based copolymer. The combination of both of these types of polymerization gives strong, three-dimensionally cross-linked interpolymers containing polymerized silicic acid as an intrinsic part of the polymer. This gives greater water-insolubility, hardness, and lower set temperatures tion is possible with the corresponding urea formaldehyde, melamine formaldehyde or phenol formaldehyde polymers which do not contain guanidine silicate.

Therefore it is possible to mix aqueous solutions of guanidine silicate with aqueous formaldehyde solutions or with solutions or dispersions of B stage formaldehyde-based polymers and to pump these into the wells where the higher temperatures prevailing there will bring about the setting reaction and thus bond the sand.

The temperatures found in wells will begin to decompose aqueous solutions of the amorphous guanidine silicates with the resulting bonding of the sand particles. Ammonia gas and urea represent the major decomposition products of the guanidine silicates. The ammonia directly aids in maintaining the porosity of the sand stratum. If faster setting and further gas formation is desired to aid in maintaining the porosity when using guanidine silicate an oxidizing agent such as hydrogen peroxide, sodium hypochlorite, potassium permanganate, potassium dichromate or manganese dioxide can be introduced to oxidize the urea to cause a secondary gas formation.

Since heat is a major factor for controlling the setting of the aqueous silicate solutions, it can be desirable to introduce a heated fluid, such as super-heated water or a heated petroleum fraction, into the sand stratum after the silicate solution which causes the consolidation of the sand and in the case of guanidine silicate will cause decomposition to form a gas that will aid in keeping the stratum porous. The resulting sand particles will be bound together by the silica and a water insoluble sand stratum will be formed along the well casing. The silica bonds between the sand particles are virtually impervious to chemical attack which has hampered previous attempts to chemically consolidate the sands in oil wells with water soluble silicates.

It is important to maintain a porous sand structure and that can be accomplished in several ways. When guanidine silicate is utilized, a gas will be formed upon heat decomposition of the silicate to form the bond. This gas will give a more porous bonded area. Another technique to retain porosity is by fluid displacement where another fluid (which can also contain a setting accelerator) is pumped into the stratum soon after introduction of the silicate solution. This will leave the sand particles coated with a bond forming silicate but remove the excess silicate which might result in the formation of a more dense sand structure. The fluid displacer can also contain a material which will form a gas under the conditions of temperature and pressure in the stratum and thereby aid in maintaining porosity.

Mixtures of either the ammonium silicate or guanidine silicate with a colloidal silica sol are also useful to aid in bonding the sand structure. Such mixtures should contain at least 5 percent by weight of the silicon dioxide in the mixture from the guanidine silicate or ammonium silicate. Other mixtures can also be used as a major amount of ammonium silicate or guanidine silicate with minor amount of an alkaline silicate e.g. sodium silicate and, if desired, a colloidal silica sol can be added to this mixture. Close control should be maintained on the alkaline silicate when it is used since the alkaline cation can be harmful to the bond between the sand particles.

The equipment used in injecting fluids such as the aqueous silicate solutions into the desired sand stratum in the oil wells is well known in the art. The area of the sand stratum to receive the guanidine silicate treatment is usually not more than four or five feet thick. However, larger areas may be treated.

Typical treatment of an oil well which has an oil producing sand stratum consists of pumping several barrells of diesel oil containing a small quantity of surfactant to preflush the well. Then several barrels of amorphous guanidine silicate containing a minor amount of formamide are pumped into the sand stratum. Bonding of the sand begins due to the ambient temperature within the sand stratum. The sand stratum in the immediate region of the well is set by this treatment. The well is then flushed with diesel oil and pumping is again initiated. No noticeable sand content is detected in the oil after the resumption of the pumping. Similar results can be obtained when ammonium silicate having an average molecular weight of less than 25,000 is substituted for the guanidine silicate.

The wells are generally preflushed to prepare the sand stratum to receive the silicate of this invention. Diesel oil is a common flushing agent for oil wells which is sometimes followed by a water flush. The diesel oil can contain other ingredients such as surfactants to aid in the flushing operation. A typical surfactant is "Hyflo" which is generally described in U.S. Patent 2,946,747. The sand stratum can also be flushed with the same materials after addition of the silicate. As mentioned earlier, this is a good means to maintain the porosity of the bonded sand stratum.

This invention is applicable to various fluid producing wells such as gas, oil and water wells. Of course, the manner of flushing the wells will greatly depend on the type of well being treated.

What is claimed is:

1. A method for the consolidation of a sand stratum in fluid-producing subterranean formations which comprises injecting an aqueous solution of amorphous ionic guanidine silicate or ammonium silicate having an average molecular weight of less than 25,000 into the sand and setting the silicate to form a fluid-permeable bonded sand structure.

2. A method as in claim 1 where said guanidine silicate or ammonium silicate is set with an acid medium.

3. A method as in claim 2 where said acid medium is from a latent acid.

4. A method for the consolidation of a sand stratum in fluid-producing subterranean formations which comprises injecting amorphous ionic guanidine silicate into said sand and setting the guanidine silicate to form a fluid-permeable bonded sand structure.

5. A method as in claim 4 where excess guanidine silicate is removed before setting of said fluid is initiated.

6. A method as in claim 4 where said guanidine silicate is set with an oxidizing agent.

7. A method as in claim 4 where said guanidine silicate is set by heating the injected guanidine silicate above 75° C.

References Cited

UNITED STATES PATENTS

| 3,121,462 | 2/1964 | Martin et al. | 166—292 X |
| 3,175,611 | 3/1965 | Hower | 166—292 |
| 3,202,214 | 8/1965 | McLaughlin | 166—292 |
| 3,205,946 | 9/1965 | Prats et al. | 166—288 |
| 3,346,334 | 10/1967 | Weldes et al. | 23—110 |
| 3,438,443 | 4/1969 | Prats et al. | |

STEPHEN J. NOVOSAD, Primary Examiner

U.S. Cl. X.R.

166—294